R. M. BECKER.
COMBINED TYPE WRITING AND COMPUTING MACHINE.
APPLICATION FILED MAY 15, 1912.
1,243,669.
Patented Oct. 16, 1917.
8 SHEETS—SHEET 5.
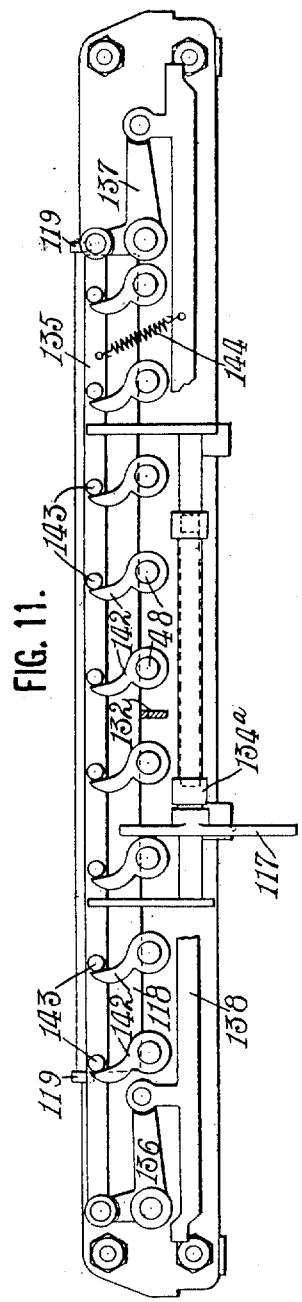
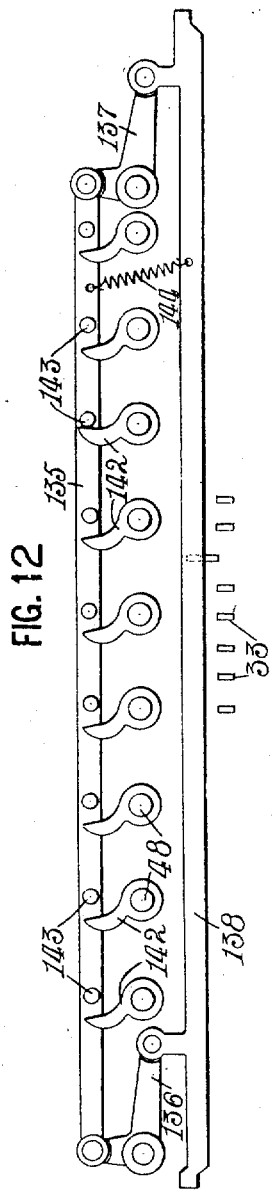
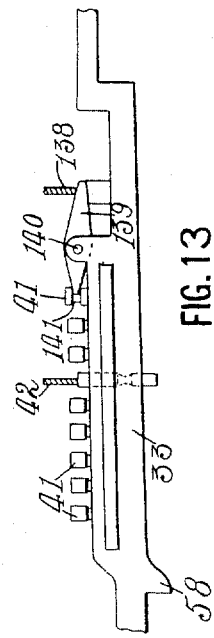

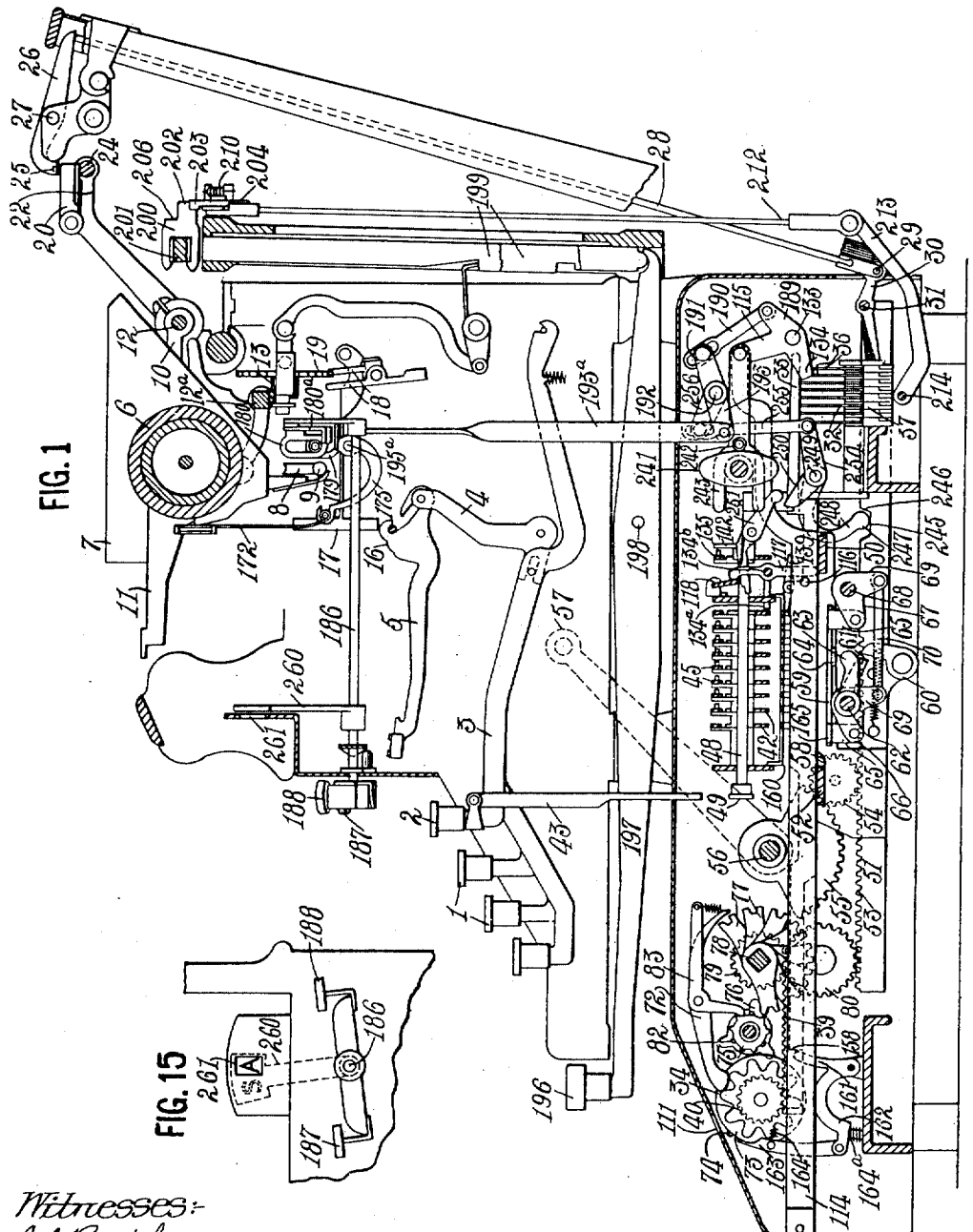

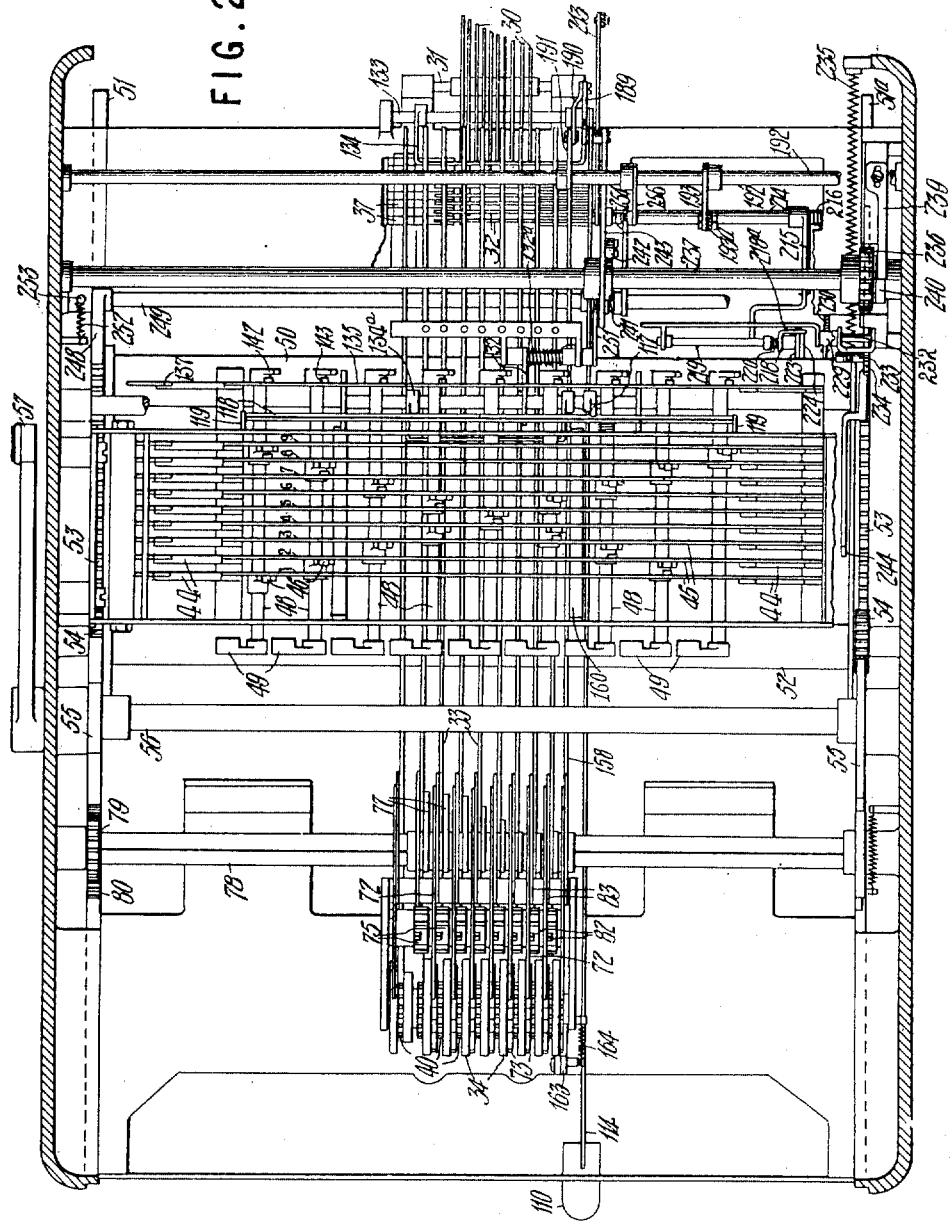

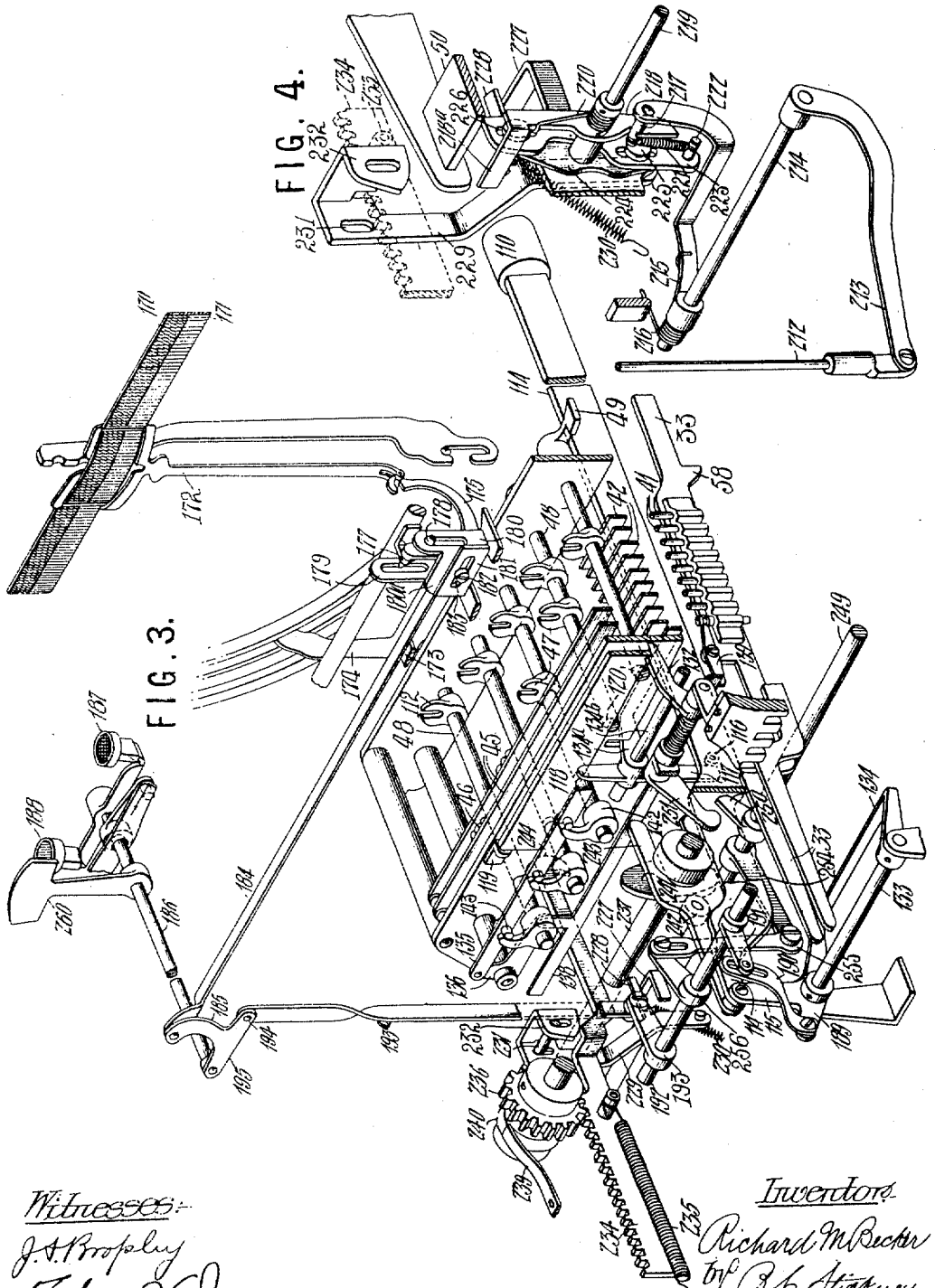

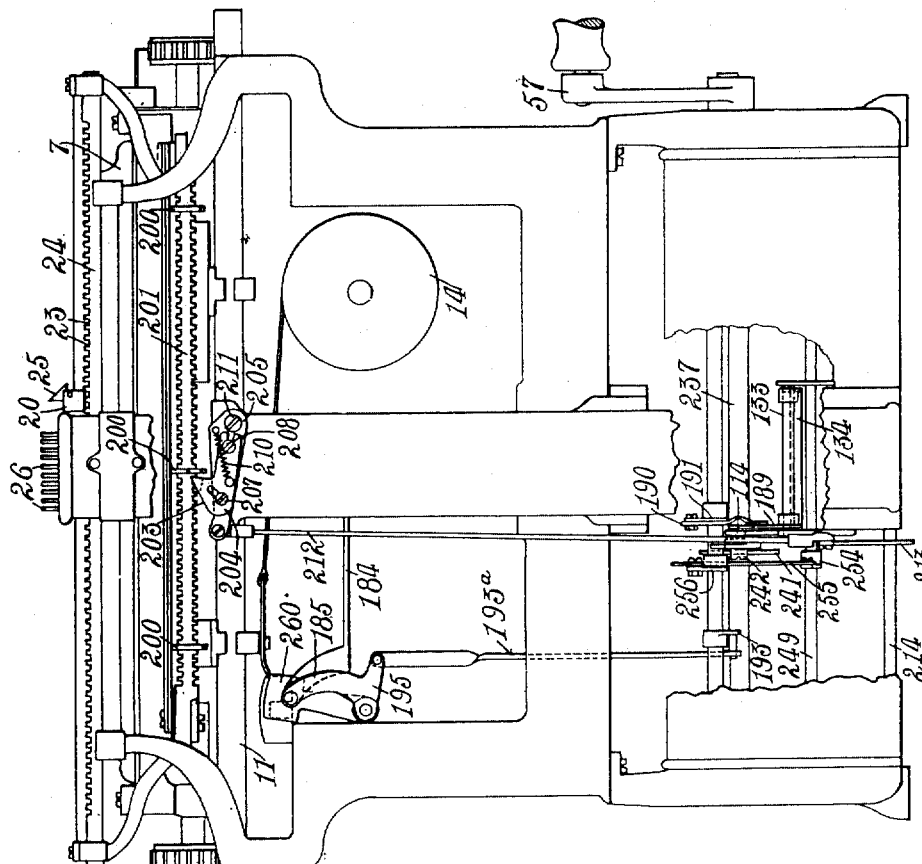

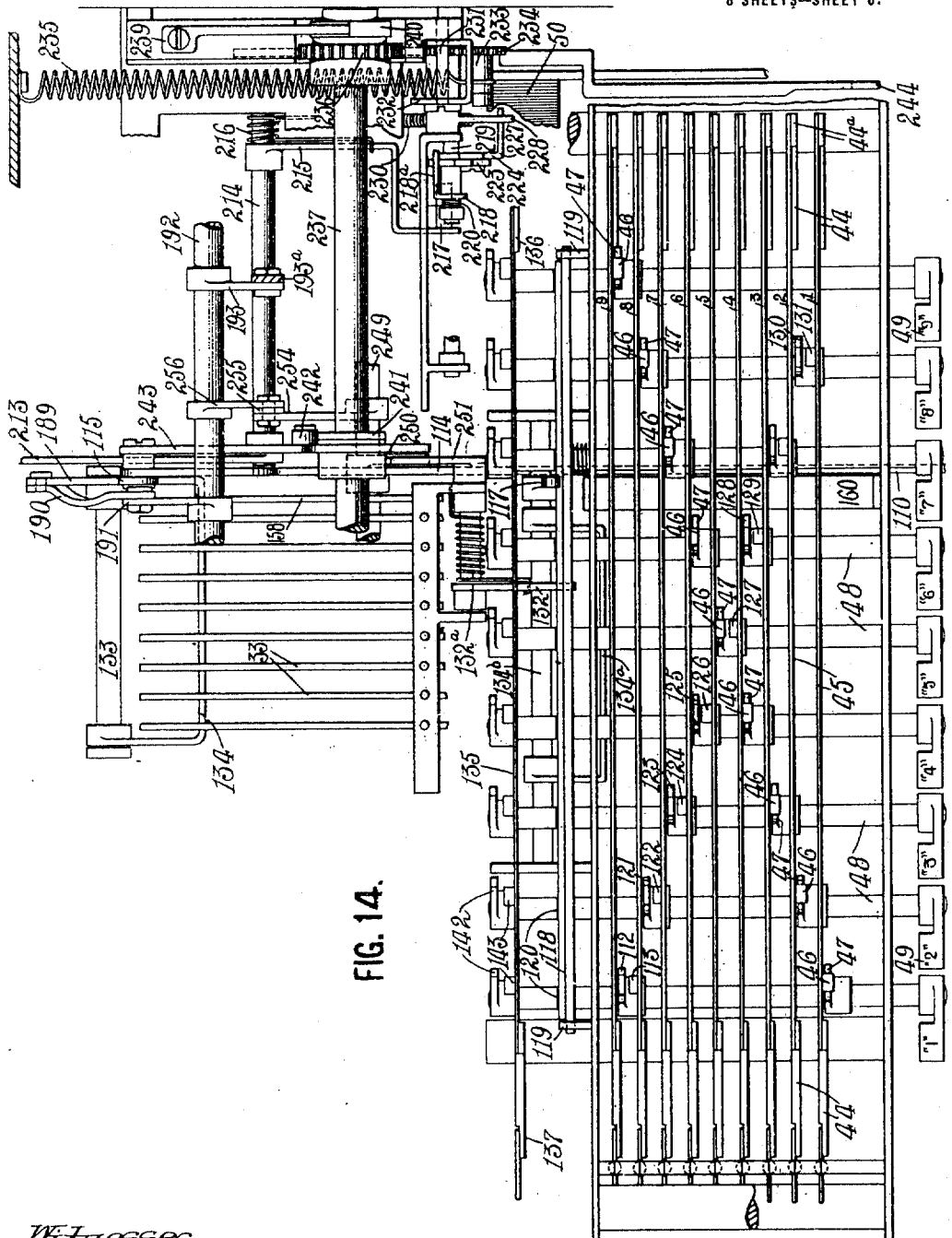

R. M. BECKER.
COMBINED TYPE WRITING AND COMPUTING MACHINE.
APPLICATION FILED MAY 15, 1912.
1,243,669.
Patented Oct. 16, 1917.
8 SHEETS—SHEET 7.
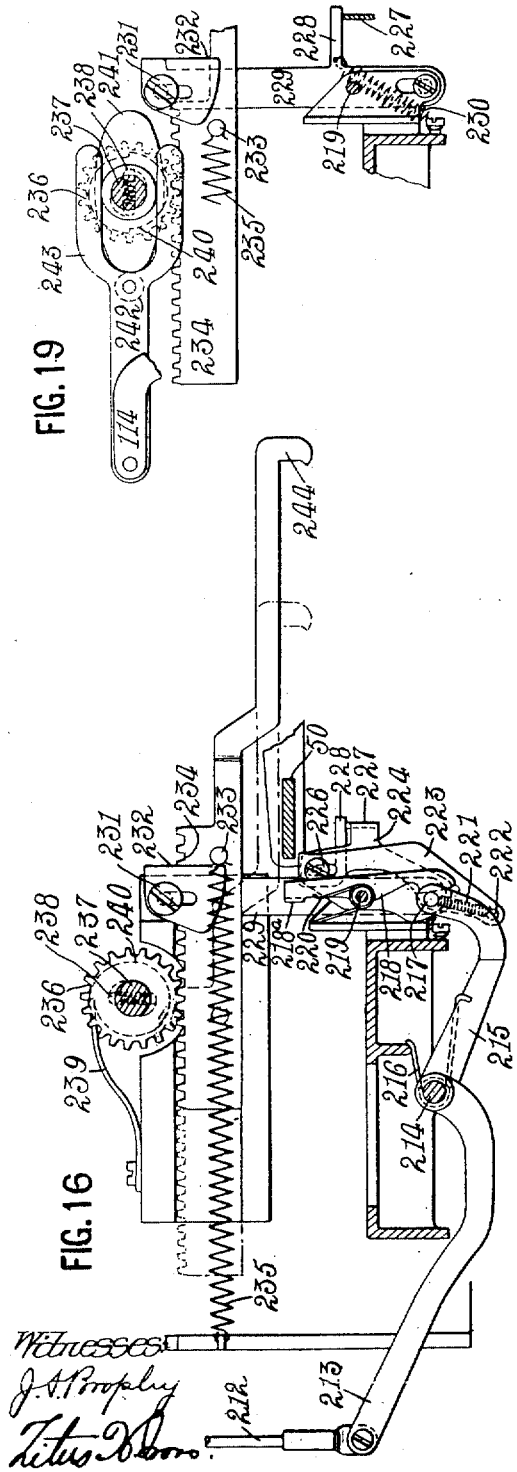
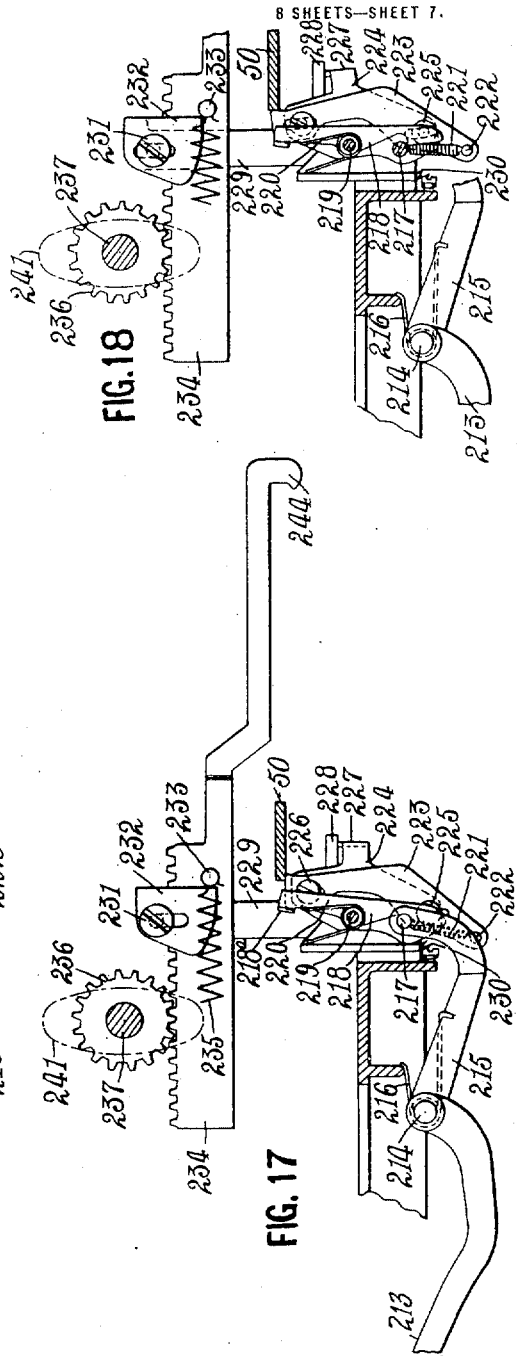

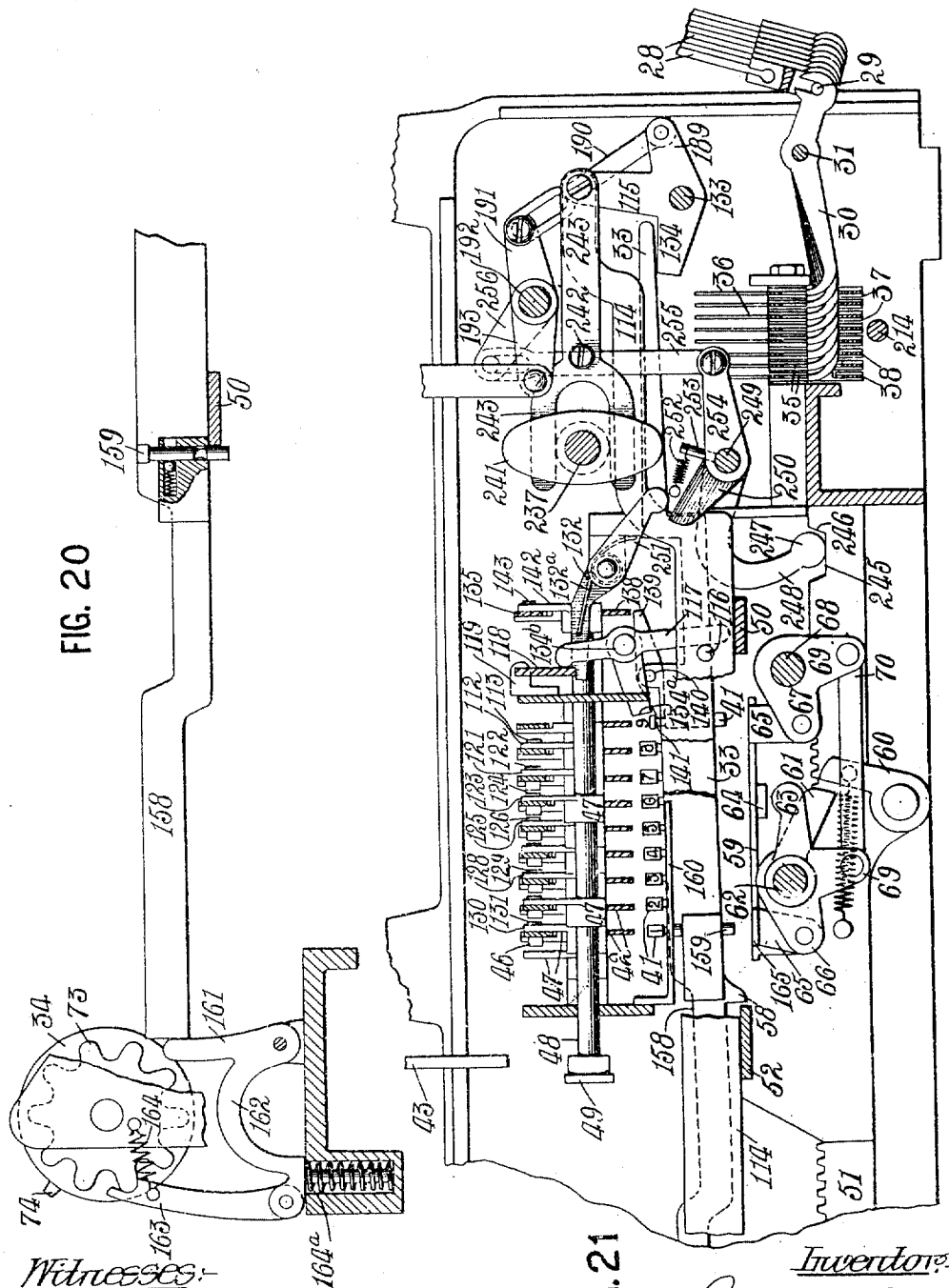

UNITED STATES PATENT OFFICE.

RICHARD M. BECKER, OF NEW YORK, N. Y., ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,243,669.  Specification of Letters Patent.  Patented Oct. 16, 1917.

Application filed May 15, 1912. Serial No. 697,393.

*To all whom it may concern:*

Be it known that I, RICHARD M. BECKER, a citizen of the United States, residing in Brooklyn borough, in the county of Kings and State of New York, have invented certain new and useful Improvements in Combined Type-Writing and Computing Machines, of which the following is a specification.

This invention relates to a combined typewriting and computing machine of the Underwood-Hanson type and more especially to a machine capable of both adding and subtracting, such as that described in application No. 626,550, filed May 11, 1911.

It is the object of this invention to enable, in this type of a machine, a change in the character of the computation, as from adding to subtracting, to be controlled from the typewriter carriage by the position thereof, so that the typewriting in a certain column or zone may correspond to adding or subtracting of the computing mechanism according to the previous setting of the machine.

In the Underwood-Hanson machine used to illustrate the exemplification of this invention, pins corresponding to the numeral keys and to the particular denominational column, are set up so as to subsequently control in accordance with the numeral keys previously struck the extent of rotation of a series of computing wheels, so that the proper numbers are exhibited thereby.

In the subtraction operation, the computing wheels are rotated in the same direction as in adding. The pin-setting mechanism, however, is changed in setting for subtraction, so that a pin corresponding to one less than the complement of the number of a key struck is set up. The tens-borrowing operation is carried out and the computation rectified by giving all the idle wheels a complete rotation, unless one has been borrowed therefrom, through a setting up of the "9" pins, and a giving of an extra tenth of a rotation to the units computing wheel.

In application No. 626,550 above mentioned the setting for subtraction was obtained by the manual operation of a subtraction key. In this case arrangement is also made whereby a special tappet or stop, carried by the carriage, automatically controls the setting for subtraction. The tappet sets connections so that a subsequent operation of the general operator will trip the same to enable them to return to their normal position, and at the same time bring into play a special subtraction setting mechanism. This latter subtraction mechanism includes a spring normally under tension, which acts at this time to pull on a rack so as to rotate a gear meshing therewith. The gear has a one way clutch connection with a shaft which operates to enable the power of the spring to rotate the shaft. On the shaft there is provided a cam which operates to set the subtraction controlling mechanism to its effective condition, enabling the subtraction action of the computing mechanism. Incidentally, the bichrome attachment of the computing mechanism is shifted so as to print red instead of black. The spring is retensioned by a subsequent operation of the general operator, which also acts to automatically change back from subtracting to adding.

Other features and advantages will hereinafter appear.

In the accompanying drawings,

Figure 1 is a vertical section taken from front to rear with parts broken away to show the underlying structure.

Fig. 2 is a fragmentary horizontal sectional view.

Fig. 3 is a fragmentary perspective view showing a portion of the pin-setting mechanism for both adding and subtracting, and also showing details of the automatic subtraction setting mechanism and its connection to the bichrome ribbon shift.

Fig. 4 is a fragmentary perspective view showing details of the subtraction setting mechanism after the same has been set by the anticipating tappet or stop, and in the act of being operated by the cross-bar on the general operator.

Fig. 5 is a rear view in elevation partly broken away to show the underlying structure.

Fig. 6 is a fragmentary view showing a subtraction tappet or stop in the act of performing its function to set the subtraction mechanism.

Fig. 7 is a view of the parts shown in Fig. 6 showing the subtraction tappet passing ineffectively by the apposite mechanism during the return motion of the carriage.

Fig. 8 is a view of the parts shown in Figs. 6 and 7 with the exception that the tappet or stop is reversed in its position so that it will not reach the subtraction setting mechanism, and therefore will pass ineffectively over the same.

Fig. 9 is a fragmentary top plan view of the parts shown in Figs. 6 to 8.

Fig. 10 is a detached perspective view of one of the subtraction tappets or stops.

Fig. 11 is a detail view showing the linkage for returning the "9" pins to their unset position on such of the column bars as may be raised at any particular instant when a numeral key is operated; the same being in its unoperated condition.

Fig. 12 is a view of the parts shown in Fig. 11 showing the parallel links of the linkage spread apart to return the "9" pin on the raised column bar.

Fig. 13 is a fragmentary view in elevation taken at right angles to the views of Figs. 11 and 12, showing one of the pins being set, and also showing the "9" pin on the same bar as raised and unset by the linkage shown in Figs. 11 and 12.

Fig. 14 is a fragmentary top plan view of the linkages for setting the pins either for adding or subtracting, and showing these linkages with the parts in a relative relation such that a setting of the pins for adding may be accomplished.

Fig. 15 is a fragmentary front view showing the indicator connected to the bichrome ribbon shift whereby the character of computation as to adding or subtracting being carried on by the computing mechanism will be indicated at this point.

Fig. 16 is a detail view partly in section from front to rear showing the subtraction setting mechanism which is controlled automatically by the subtraction tappets or stops carried by the carriage. In this view the parts are all shown in their normal position.

Fig. 17 is a view similar to Fig. 16 showing the parts moved to a set position by a subtraction tappet or stop but with the slide of the trip prevented from upward movement by the cross-bar of the general operator.

Fig. 18 is a view similar to Figs. 16 and 17, except that the general operator is moved forward and returned so that the slide of the trip has moved upwardly to a position projecting in the path of the cross-bar of the general operator. This view also shows the general operator in the act of rocking the trip so as to lift the lock and enable the tension spring to rotate the cam shaft, and thus set the subtraction controlling mechanism to its active condition.

Fig. 19 is a view of certain of the parts shown in Figs. 16 to 18, and showing the rack being moved by the tensioned spring so that the cam shaft has rotated to set the subtraction controlling mechanism, the shaft and cam having rotated but a portion of a cycle, that is, one-quarter of a revolution, and having still another quarter to move before stopping.

Fig. 20 is a detail view in elevation partly in section showing the means for giving an extra tenth of a rotation to the units computing wheel.

Fig. 21 is a fragmentary vertical section showing the subtraction setting mechanism at the instant of setting by the subtraction key, and before the subtraction key is returned to its normal position.

In the Underwood-Hanson combined typewriting and adding machine, illustrated in the drawings, alphabet keys 1 and numeral keys 2 (Fig. 1) operate to depress levers 3, to vibrate bell cranks 4 to swing type bars 5 upwardly and rearwardly against a platen 6. The platen shifts to permit different types to print, being mounted in a vertically shiftable platen-frame 7 having a roll 8 to run on a shift-rail 9. The platen frame is connected by arms 10 to a non-shifting letter-feeding carriage 11; said arms mounted on a rock shaft 12, which is journaled in said carriage, permitting the platen frame 7 to shift up and down. Said carriage 11 has a rack 12$^a$, meshing with a pinion 13 forming part of a letter-feeding mechanism. The carriage is driven by a spring barrel 14. Each type-bar has a heel 16 to operate a universal bar 17, which controls dogs 18 to coöperate with an escapement wheel 19 connected to said pinion 13, so that as every type key is operated, the carriage 11 is fed a letter-space.

On rock shaft 12 are rigidly mounted two rearwardly extending arms supporting a rod on which is rotatably mounted a denomination selecting tappet 20, adjustable along said rod, and capable of being locked in any desired position by means of a tooth 22 engaging one of a series of notches 23 formed in a rack bar 24, also carried by said arms.

This tappet 20 has a tooth 25 to engage consecutively with jacks 26 and lift the latter; the tooth 25 being beveled or cam-shaped for this purpose, and the jacks being correspondingly shaped. The jacks are levers pivoted upon a rod 27 fixed on the framework; and, when actuated by tooth 25, each jack depresses one of a series of thrust rods 28. These jacks and thrust-rods are employed for the purpose of selecting the computing wheels to be operated, or of determining the denomination of the number which is to be added, or in other words, of determining the place in a column in which computing is to be effected. The first jack to be operated by the tappet 20, as the carriage runs in letter-feeding direction, is the jack of highest denomination, for instance millions.

The connection from the jacks to the computing wheels is as follows: The rods 28 at their lower ends are pivoted at 29 to levers 30, the latter pivoted loosely between their ends upon a fixed rod 31, and extending forwardly therefrom beneath a set of links 32, overlying which are forwardly extending denominational or column-selecting rack bars 33 for operating the computing wheels 34 at the front of the machine. Said links 32 have pendent stems 35 to be engaged and lifted by the forward ends of the levers 30, and also rising stems 36 (Fig. 21) to engage and lift the wheel-operating rack bars 33. Each of said links 32 forms a member of a linkage; the other members of which comprise diagonal links 37 and a connecting link 38; whereby each link 32 is caused to rise about vertically. These linkages serve to form cross-connections between the jacks 26 and the rack bars 33; the denominational order of the latter being the reverse of that of the former; the jack 26 of highest denomination being at the right of the series, while the computing wheel 34 of highest denomination is at the left of the series.

Each of the rack bars 33 carries at its forward end teeth 39 to mesh with a pinion 40 (Fig. 1) with which each of the computing wheels 34 is provided.

The effect that each jack 26 has on its associated rack bar 33 is to lift the rear end of the latter, while the other rack bars remain in normal positions; and the purpose of lifting or selecting the rack bar is to permit the setting of any selected one of a vertically extending row of pins 41 thereon; the pins being set by means of said numeral keys 2.

Said numeral keys are connected respectively to transverse pin-setting bars 42 overlying the pins 41, but incapable of reaching the latter when the rack bars 33 are down in normal positions; but if any rack bar is lifted by its jack 26, in the manner already explained, then the depression of any numeral key 2 (the carriage 11 remaining stationary) will cause the corresponding setting-bar 42 to descend and engage the underlying pin 41, to force the latter to project down below the lower edge of its rack bar 33. This downwardly-projecting pin then serves as a lug, by which the rack bar is driven forwardly to rotate its associated computing wheel in a manner that will presently be explained.

When the carriage 11 is moved to such a position that the tappet 20 is in the field of the jacks 26, and one of the latter is lifted by the tappet, if a key 2 be depressed, it will push down a stem 43 to operate a linkage, whereof said pin-setting bar 42 constitutes a member. There are nine pins 41 (marked "1" to "9," Fig. 21) on each rack bar 33, forming a row extending longitudinally of said rack bar; and the pins on all the rack bars taken together form rows extending crosswise of the machine, a bar 42 overlying each row. Each bar 42 (see corresponding linkages, Figs. 11 and 12) forms a link between opposite bell-cranks 44; being connected to horizontal arms of said bell cranks; the vertical arms 44$^a$ of said bell-cranks are connected by horizontal links 45; these links 45 having wrists 46, engaged by slotted arms 47 fixed upon forwardly-extending rock shafts 48, carrying horizontal rock arms 49 just beneath and in position to be engaged by the descending key stems 43, Fig. 1. The manner in which each of the pin-setting bars 42 overlies a transverse row of settable pins 41 is clearly illustrated at Fig. 3. The linkages 42, 44 and 45 are marked "1" to "9" (Fig. 2) and form a nest extending horizontally across the machine overlying the pins 41 and their rack bars 33. The foremost of these linkages is operated by the numeral key 1, the next rear linkage is operated by the numeral key 2, and the next by the numeral key 3, and so on; there being nine of the linkages. The forward pin-setting bar 42 being, as just explained, operated by the numeral key 1, is capable of depressing the foremost pin 41 on any of said rack bars 33. This pin is situated so far forward on said rack bar, that only a minimum stroke is given to the latter by a subsequent operation of the machine; and hence the associated computing wheel 34 is turned a minimum distance, that is, one-tenth of a revolution.

The device that carries the rack bars forward is a horizontal bar 50, which is caused to move horizontally forward and pick up the rack bars 33 by means of the projected pins 41, so that the strokes of the several rack bars, and hence of their associated computing wheels, depend upon which pin in each rack bar was depressed, or in other words which numeral key was operated. The tappet 20 on the carriage selects the wheel, and any numeral key 2 may determine the extent of rotation of the selected wheel. Upon the return of key 2, the carriage 11 feeds, and the tappet 20 lifts the next lower jack 26.

Said horizontal bar 50 forms a part of a "general operator," which also comprises a pair of slides 51, 51$^a$, at opposite sides of the machine, mounted in suitable guides upon the base and rigidly connected by said bar 50, as well as by a forward cross-bar 52 just beneath the rack bars 33; the slides and the bar taken together forming a frame, and constituting the general operator of the computing wheels. These slides are formed with racks 53, to mesh with pinions 54 pivoted upon the side walls of the machine frame, said pinions in turn meshing with segments 55 fixed upon the opposite ends of a horizontal rock shaft 56 extending across the machine and carrying at one end outside of the frame a long handle 57, which is swung forwardly from the Fig. 1 position to advance the general operator and cause the bar 50 to advance the rack bar 33, to turn the pinions 40 and computing wheels 34. Upon the return stroke of the handle 57, said crossbar 52 of the general operator engages shoulders 58 (Fig. 1) formed upon the under sides of the rack bars 33 and returns them to normal rear positions.

During the last part of the return stroke of the general operator, a universal pin-restorer in the form of a horizontal plate or tablet 59 (Fig. 1) is caused to lift and restore all of the depressed pins 41 to their normal positions on the rack bars 33 (this being a function of said general operator). Said universal restoring plate is actuated by a cam 60, mounted upon the left hand slide 51 of the general operator to engage a rock arm 61 pendent from a horizontal rockshaft 62, the latter extending across the machine and mounted in the side walls of the machine frame, and having near its middle an arm 63 to engage and lift a projection 64 provided on said universal pin-restoring plate 59. The latter is mounted for up and down parallel movement by means of forward and rear ears 65, which are pivoted to horizontal arms of bell cranks 66, 67, the former loosely mounted on said shaft 62 and the latter loosely mounted on a shaft 68 parallel with said shaft 62. Said bell cranks comprise pendent arms 69 which are connected by a link or links 70. At the last part of the return of the general operator, the cam 60 engages the arm 61 and turns the shaft 62, causing arm 63 thereon to rise and lift said pin-restoring plate. It will be noticed that the cam 60 is pivotally mounted on said slide 51, to permit it to pass freely under the arm 61 during the forward stroke of the general operator.

When the rack bars are being returned rearwardly by bar 52 of the general operator, the pinions 40 turn idly, the latter having pawl and ratchet devices, not shown.

The computing wheels are held steady by spring detents 72, Fig. 1, which engage gears 73 fixed on the respective computing wheels; said gears 73 serving also as tens-carrying gears. The tens-carrying operation is initiated by special teeth 74 (Fig. 20), one of which is fixed upon each of the computing wheels 34, in position to engage and operate, once in each revolution of wheels 34, an adjacent tens-carrying pinion 75 (Fig. 1), the latter provided with a three-toothed gear 76 in position to mesh with and turn the gear 73 fixed on the computing wheel 34 of next higher denomination. Although the tens-carrying operation depends upon the actuation of a pinion 75 by the tooth 74 upon the computing wheel 34, still such tooth merely initiate the tens-carrying operation, the latter being completed by means of one of a series of power-driven rocking segments 77. There is one segment 77 for each of the computing wheels except the units wheel; and these segments are fixed upon a transverse horizontal shaft 78 which has at one end a pinion 79 (Fig. 1), the latter meshing with an idle pinion 80, which in turn meshes with the teeth 53 on the left-hand slide 51 of the general operator, so that the pinion 79 is rotated forwardly and backwardly about a complete revolution at each cycle of movements of said general operator. The tens-carrying segments, however, are intended to rotate only in one direction; and hence the shaft 78 on which they are fixed is connected by a ball or other clutch (not shown) with said pinion 79, so that the rotation of the pinion during the advance of the operator is an idle one; the segment shaft 78 being turned only during the return stroke of the operator. In other words, during the forward stroke of the general operator, the teeth 74 on certain of the computing wheels 34 operate to set the tens-carrying pinions 75, and during the back stroke of the operator, the segments 77 engage the pinions 75 and complete the tens-carrying operations by giving one-tenth of a revolution each to the corresponding computing wheels 34. The tooth 74 on each wheel 34 imparts to the tens-carrying pinion 75 one-ninth of a revolution; there being nine teeth on said pinion; and each segment 77 is intended to turn its pinion two-ninths of a revolution; each pinion being thus turned one-third of a revolution in all, in order to rotate the gear 73 and the next wheel 34 one-tenth of a revolution.

Every third tooth on each tens-carrying pinion 75 is cut away, a portion 82 being left, however, sufficient to be engaged by a spring detent 83; the tooth being cut away so that the tens carrying segments 77 may swing idly past the tens-carrying pinions when the latter are idle; the gap between the teeth adjacent to the cut-away tooth being sufficient to permit the free movement of segment 77. The tooth 74 on any computing wheel 34, by moving the tens-carrying pinion 75 one-ninth of a revolution, turns said pinion into position for engagement by its associated segment 77 upon the next return movement of the general operator; whereby said pinion is advanced an additional one-sixth, and the wheel 34 of next higher denomination is turned one-tenth of a revolution. The segments 77 are arranged in spiral order on the shaft 78, so that tens-carrying may proceed from low to high denominations throughout the gang of computing wheels during a single return stroke of the general operator, whereby all the wheels may be turned from "9" to "0" progressively during said operator stroke.

The machine is capable of subtracting as well as adding. In effecting subtraction, the computing wheels are turned in the same direction as when adding. In subtraction, as in addition, the movements of the computing wheels are effected or controlled by the general operator above described.

To set for subtraction by hand, a subtraction key or finger-piece 110 is pressed. One of the functions of this key is to set all the "9" pins 41 on the rack bars 33. The handle 57 of the general operator may be then pulled forward, whereby all of the rack bars 33 are advanced and caused to turn their wheels each through nine-tenths of a revolution. Upon the return stroke of the general operator, the described tens-carrying mechanism will operate to complete the revolution of each computing wheel through 360 degrees, except that of lowest denomination; the latter being advanced automatically one notch by means that will presently be explained. Thus if said key 110 be operated and then the handle 57 be swung forwardly and backwardly, all of the number wheels 34 will be turned idly an entire revolution, even though no numeral key is operated, and regardless of the initial positions of the several wheels, so that the same reading will be given at the sight opening 111 as before.

If, after pressing the subtraction key, any one of the numeral keys is operated, as for instance the key marked "2," the "9" pin on whichever rack bar 33 is in action, will be automatically restored to its normal idle position, and another of the pins 41 on said rack bar will be projected (by means presently to be described), namely the pin which is the second one forward from the "9" pin just restored. Hence, when the handle 57 is operated, the cross-bar 50 will advance the rack bar in question only seven points, while the remaining rack bars are advanced nine points; and upon the return stroke of said handle, each number wheel will of course be advanced another step or unit movement. Therefore all of said number wheels will show the same reading as before, with the exception that one of them will show a number which is two less than the number that it previously showed. In effect, two has been subtracted from the amount previously shown on the selected number wheel.

From the foregoing, it will be understood that at the subtraction operation the numeral key marked "1" if depressed, must set a pin 41 which is next forward from the "9" pin on the selected rack bar 33; the key marked "2" must depress the pin which is second forward from the "9" pin on the selected rack bar; the key marked "3" must depress the third pin forward from the "9" pin; that marked "4" must depress the fourth pin forward; that marked "5" must depress the fifth pin forward; that marked "6" the sixth pin forward; that marked "7" the seventh pin forward; that marked "8" the eighth pin forward; but the key which is marked "9" must not depress any pin, since nine from nine leaves nothing, and hence the selected number wheel must remain stationary during the forward stroke of the handle 57, i. e., it must drop nine points behind such wheels as are to make an entire revolution. In each case it will understood that the "9" pin which has been previously set by the operation of the subtraction key 110, must be restored to its normal idle position, so that the rack bar 33 whose pin is projected by the "1" key, will be advanced one less than nine, or will drop behind to the extent of one point; that whose pin was projected by the "2" key will be advanced two less than nine, (dropping back two points); that whose pin was projected by the "3" key will be advanced three less than 9, and so on; the rack bar coöperating with the "9" key not being advanced at all. From this it will be understood that at the forward stroke of the handle 57 the rack bars having pins set by means of the numeral keys will be advanced correspondingly, and their associated number wheels will be turned accordingly; while all the remaining rack bars 33 will be advanced full strokes, and their wheels turned nine points. Certain wheels may also be turned each an additional point during the return stroke of the handle 57 and the general operator connected thereto. The means whereby the subtraction key 110 shifts the connections between the numeral keys and the settable pins 41, so that the desired result can be obtained, will presently be described.

Assuming that all the wheels read "0" at the sight opening 111, and that the subtraction key 110 be pressed back, and that the numeral key bearing the figure "1" is depressed, and the handle 57 swung forwardly and then backwardly; the carriage 11 standing in such a position that the tappet 20 is connected through a jack 26 with the units rack bar 33, it will be understood that all of the "9" pins on the rack bars 33 will have been depressed by key 110, and that the "9" pin on the units rack bar 33 will have been restored again to normal idle position by the key "1," and also that the pin next forward thereof will have been simultaneously depressed. The forward stroke of the handle 57 will have caused the cross bar 50 to advance all of the rack bars nine points, except the units rack, which is advanced only eight points, so that the number now appearing at the sight opening is "999,999.98." Upon the return stroke of the handle the units wheel is advanced automatically an additional point, as will presently be explained, while the remaining wheels remain motionless, so that the number finally shown at the sight opening is "999,999.99." Since the units wheel has not been advanced an entire revolution from its "0" position, it has failed to operate the tens-carrying mechanism, and hence the wheels of higher denominations stand in the positions to which they were brought at the forward stroke of the handle 57, by reason of their "9" pins 41 having been all set by the subtraction key 110. It will thus be seen that the effect of moving said key 110 is to cause "1" to be subtracted from every number wheel during the ensuing forward stroke of the handle 57, regardless of where the number wheels may originally stand; and whether this loss of "1" is restored upon the return stroke of the operating handle 57, depends upon the positions of the tens-carrying members at the time. Where a rack bar 33 has been unaffected by any of the numeral keys, it turns its wheel nine points on the advance stroke of the handle 57, and the tens-carrying mechanism advances the same wheel one point upon the return of said handle 57, unless the operation of certain of the numeral keys has affected the pins on one or more of the other rack bars 33 in such a manner as to affect the tens-carrying mechanism so that it will fail to act in this particular instance on the return stroke of the handle 57.

Assuming that the number shown at the sight opening 111 is "000,088.88", and that it is desired to subtract a number which contains several zeros, as for instance 20.06, the carriage 11 is first moved to the thousands place, the subtraction key is pressed back, and the numeral key "2" is operated. Then the numeral key "0" is struck twice, and then the numeral key "6". Then the handle 57 is drawn forward, turning each of the first four wheels nine points. At the same time the thousands wheel is advanced two less than nine points (or seven points), the hundreds wheel is advanced nine points, the tens wheel is advanced the same, and the units wheel is advanced six less than nine points (or three points). In other words, the thousands wheel and the units wheel drop behind the remaining wheels, and the number appearing at the sight opening is "999,957.71". In advancing the thousands wheel seven points from "8" to "5", the associated tens-carrying pinion 75 was turned by tooth 74. The tooth 74 on the units wheel also turned its tens-carrying pinion. It will also be understood that in turning nine points from "8" to "7", each of the tens and hundreds wheels also advanced or set its associated pinion 75. Upon the return stroke of the handle, the units wheel is advanced automatically one point, as will presently be explained, the units segment 77 turns its pinion 75 and advances the tens wheel to "8". The next segment likewise advances its hundreds wheel to "8". The next advances the thousands wheel to "6"; and tens are likewise carried on all the higher wheels, so that the number at the sight opening reads "000,068.82". Thus it will be seen that at the forward stroke of the handle 57 some of the tens-carrying pinions 75 may be advanced by the special teeth 74, while others may not; and at the return stroke of said handle 57, all of such tens-carrying pinions 75 as have been so advanced will be turned still more by their segments 77, in each instance advancing the wheel of next higher denomination.

The subtraction operation thus involves revolving idly through an entire revolution such wheels as are not in use, and it involves the use of the tens-carrying mechanism in such a way that tens are in effect borrowed from wheels of higher denomination to such an extent as may be requisite, the tens being borrowed during the advance stroke of the handle 57, and being restored by the tens-carrying mechanism on the return stroke of the general operator only in such cases as are requisite.

As before stated, the subtraction key 110 shifts certain connections whereby the numeral keys 2 set the pins 41, so that the key "1" will set the pin next forward of the nine pin on any selected rack bar 33, the key "2" will set the pin two points forward of the nine pin, and so on, to cause the selected number wheels to drop behind, each to a corresponding extent, at the general rotation of the computing wheels during the cycle of subtracting operations. The same nest of cross-links 45 is used in the subtracting operation, as in the adding operation heretofore explained; and each cross-link is associated with the same cross-row of pins 41 as in performing addition; but at the subtracting operation the first key "1", instead of operating the foremost cross-link 45, as in the adding operation, is connected to that link which is just forward of the rearmost cross-link. This connection is effected by means of a slotted arm 112, Figs. 14, 21, which engages a subtraction wrist 113 provided upon the link in question; the addition wrist 46 on the opposite end of the same link being disengaged and out of use at the subtraction operation. The shifting of the arm 112 into engagement with the wrist 113 is effected by the pressing back of the key 110, which it will be seen, is attached to the front end of a horizontal push rod 114, Figs. 1 and 21, pivotally supported at its rear end upon a rock-arm 115, and having between its ends a wrist 116, Fig. 21, which engages the lower end of a lever 117 and presses it back, the upper end of said lever swinging forwardly to press in the same direction a universal shifter bar 118, which extends across the machine and is pivoted at its opposite ends in fixed ears 119; the lower edge of said shifter bar engaging peripheral grooves or slots 120 in all of the forwardly extending rock-shafts 48 which carry at their forward ends the key-operated arms 49. The forked arm 112, which is normally out of engagement with the subtraction-wrist 113, is hence shifted forward into engagement therewith; but at the same time the arm 47 which is fixed upon the same rock-shaft 48, is shifted out of engagement with the addition wrist 46 on the foremost cross-link 45.

A similar operation takes place with respect to each of the other cross-links; arm 121, (Figs. 14 and 21) on the second rock-shaft 48 (operated by the key "2") slipping into engagement with the subtraction-wrist 122 on the third cross link from the rear, while the forward arm 47 on the same rock shaft slips out of engagement with the addition-wrist 46 on the second cross-link from the front. On the third rock-shaft (operated by the key "3") arm 123 slips forward into engagement with the subtraction-wrist 124 on the fourth cross-link from the rear, while the other arm 47 on said shaft slips out of engagement with the wrist 46 on the third cross-link from the front. Numeral key "4" controls a shaft 48 on which is fixed a rock arm 125, which at the forward shifting of said shaft slips into engagement with a subtraction-wrist 126 on the fifth cross-link from the rear; while the forward arm 47 on the same rock shaft slips out of engagement with the wrist 46 on the fourth cross-link from the front. Upon the next rock shaft 48, which is operated by the numeral key "5," is but a single rock arm 47, and this is shifted out of engagement with the addition-wrist 46 on the fifth cross-link from the front, and into engagement with a subtraction-wrist 127 on the sixth cross-link from the rear. The key "6" operates a rock shaft which likewise has a subtraction arm 128, which is slipped into engagement with wrist 129 on the seventh cross-link from the rear, while the rock arm 47 on this shaft is slipped out of engagement with the addition-wrist 46 on the sixth cross-link from the front. The rock shafts operated by keys "7" and "8" are correspondingly equipped and shifted, the rock-shaft for the key "8" having an arm 130 which is shifted into engagement with a wrist 131 on the ninth cross-link from the rear; this being the last link of the nest. The key "9" rocks the extreme right-hand shaft 48 of the series; and at the operation of the subtraction key 110, the arm 47 on said shaft is shifted out of engagement with the wrist 46 on the rearmost cross-link 45 of the nest; but no other arm is provided on this shaft, since at the subtraction operation the shaft turns idly; the number wheel 34 which is at the time associated with said rock shaft not being advanced by its rack at the forward stroke of the general operating handle 57, and said number wheel hence dropping nine points behind the normal advancing movement of the number wheels at such stroke of said handle.

The levers 49 on the forward ends of said rock shafts are thick enough to compensate for their forward shifting movements, so that the key stems 43 may always engage the same; and it will be understood in subtracting that when key "1" is depressed, the first cross-link 45 forward of the "9" cross-link, (which is the rearmost of the nest) is thrust to the left, and the corresponding pin 41 is depressed upon such rack-bar 33 as happens to be elevated; that when key "2" is depressed, the second cross-link 45 from the rearmost is operated, and a pin 41 is depressed which is second from the rearmost pin on any elevated rack bar 33; and so on throughout the series; no pin 41 being depressed, however, when the "9" key is operated, for reasons just given. Each of the keys "1" to "8" therefore sets a pin whose value is one less than the complement of the key. The diagonal row of subtraction arms intersects the row of addition arms. The "5" arm may be regarded as a double arm, one arm or portion to engage the "5" link and the other to engage the "4" link.

When the subtraction key 110 is pressed back to swing the universal shifter bar 118 forward, to shift endwise all of the rock shafts 48, a latch 132 is snapped by a spring 132ª to a position behind said universal shifter bar, to detain the same in its effective position, so that the user of the machine may release the subtraction key 110, and have both hands free to manipulate the type-operating keys.

It has been above stated that operation of the subtraction key 110 sets "9" pins 41 on all of the wheel-operating rack bars 33. To do this, all the racks are simultaneously lifted; said arm 115, to which the rod or stem 114 is pivoted, being fixed upon a rock shaft 133, which has a universal bar or bail 134 extending across under the rear ends of all of the rack bars 33, so that when said stem is thrust rearwardly, the shaft is rocked and all of said rack bars are lifted. The "9" pins on said racks are all simultaneously depressed or projected below the rack bars by a universal bail 134ª fixed on the same rock-shaft 134ᵇ which carries the lever 117 (Figs. 1 and 21); said bail engaging and depressing the forward ends of levers 139 (which are connected to the "9" pins) sufficiently to force the "9" pins to project below the rack bars, where they may be all subsequently engaged by the cross bar 50 of the general operator, so that at the forward movement of the latter, all of their number wheels may be rotated nine points.

As above explained, whenever all the "9" pins have been set by the subtraction key 110, and a numeral key has been thereafter operated to set a pin upon any selected wheel-operating rack bar 33, the originally set "9" pin on the same rack bar is automatically restored to normal idle position. This is done by means of a universal linkage, operable by all of the numeral keys. It comprises a transverse endwise-moving link 135, Figs. 1, 11, 12 and 21, bell cranks 136, 137, and a transverse downwardly-moving link or bar 138 in position to depress (Fig. 21) any of a set of levers 139 which are mounted upon the rack bars 33 and connected to the "9" pins to move the same. Each lever is pivoted between its ends at 140 (Fig. 13) to its rack bar 33, and at its forward end fits in a groove 141 formed in the "9" pin 41; and when any rack bar 33 is lifted by the carriage tappet 20 (through a jack 26, etc.,) and any numeral key 2 is depressed, the universal link 138 will press down the lever 139, as shown in Fig. 13, thus restoring the "9" pin 41 on said elevated rack to its normal condition. All of the key-operated rock shafts 48 are provided on their rear ends with upstanding arms 142, to engage corresponding wrists 143 on said cross link 135, to effect the restoration to normal idle condition of the "9" pin previously set by the subtraction key 110; a spring 144 (Fig. 12) serving to return this universal pin-restoring linkage to normal position upon the release of the depressed numeral key. Normally the arms 142 stand back of the wrists 143 and are hence ineffective at the adding operation; but when the shafts 48 are shifted forwardly by the subtraction key 110, said arms are shifted therewith into positions for engaging the wrists 143.

The subtraction key 110 returns to normal position as soon as released, together with the rock shaft 133, and the bail 134; the weight of the bail and of the rear end of the racks being sufficient to return the parts.

As before explained, the operation of the subtraction key 110 is intended to set the machine to give a complete idle revolution to all of the computing wheels which have rack bars 33; and in order to effect this, the tens-carrying mechanism is depended upon, the wheels being given an advance rotation of nine points at the forward stroke of the general operator handle 57, and, if required, an additional advance of one point by the tens-carrying mechanism at the return stroke of the general operator. The tens-carrying mechanism of course cannot operate the units wheel, but there is provided a special device to effect the necessary advance of the units wheel a single point at the return stroke of the general operator, preferably at the initial portion of said return stroke, before the operation of the tens-carrying mechanism. A slide bar 158, Fig. 20, somewhat resembling the wheel-operating rack bars 33, is mounted at the right of the nest of rack bars 33, and is provided with a single settable pin 159, preferably in line with the "1" pins 41 on said rack bars. The subtraction key 110 lifts this special bar 158, as well as the bars 33, and said pin 159 encounters a fixed abutment 160 during the upward movement of bar 158, and is forced to project from the bottom of said bar, where it is engaged by the cross bar 50 of the general operator at the last part of the forward stroke of the latter, whereby the bar 158 is thrust forward, to engage and operate an arm 161 of a bell-crank, to the other arm 162 of which is pivoted a pawl 163 the latter caused by a spring 164 to engage a ten-toothed wheel 73 fixed to the units wheel 34. The effect of the forward movement of the bar 158 is to swing down the arm 162 of the bell-crank, pulling down the pawl 163 to position to engage the succeeding tooth of the wheel 73. A spring 164ª returns the bell-crank 162, pawl 163 and bar 158 to normal positions, the pawl advancing the toothed wheel 73 and the units wheel to the extent of one-tenth of a revolution, so that the next higher number thereon is shown at the sight opening 111. The universal pin-restoring plate 59, has an ear 165 to restore the pin 159 on the bar 158, that operates the units wheel pawl 163.

In the Underwood typewriting machine, the types strike through a ribbon, which is shown at Fig. 3 as comprising an upper stripe 170 of one color and a lower stripe 171 of another color, said ribbon being threaded through a vibrator 172 which is connected to a frame 173, the latter fixed by arms 174 to the universal bar 17, which reciprocates at every type stroke. As shown in Patent No. 926,050 to F. A. Cook, the vibrator 172 is connected to a lever 175, the latter comprising an arm 176 provided with upper and lower opposite wrists 177, 178, to engage slotted ears 179, 180 in an actuating head 180ª, which is adjustably connected to a bracket 181 fixed upon said universal bar frame 173; said actuating head having a guide pin 182 to slide in a slot 183 in said bracket 181. The actuating head 180ª is connected by a link 184 (which vibrates idly at the type strokes) to an arm 185 fixed upon a forwardly extending rock shaft 186, having at its forward end keys 187, 188, whereby adjustment of the actuating head 180ª is effected, to bring it into engagement with either wrist 177 or 178, to vary the throw of the lever 175 at the type strokes, so as to bring either stripe 170 or 171 into action. The stripe 170 is usually black, and is used for addition, etc., while stripe 171 is red, and in the present case is used when writing a number that is to be subtracted; said stripe 171 being called into action by the subtraction key 110. As already explained, said subtraction key is on a rod 114, the rear end of which is pivoted to arm 115 on rock shaft 133. This rock shaft also carries an arm 189, Figs. 1 and 21, to which is pivotally connected a link 190 having a pin and slot lost motion connection with an arm 191 secured on a rock-shaft 192. Also secured to the rock shaft 192 is an arm 193 connected to the bichrome shift mechanism by a link 193$^a$ which is pivoted at 194 to an ear 195 formed on the ribbon-shifting arm 185. When the subtraction key and rod 114 are pressed back, the shaft 133 is rocked and the arm 189 moves down to force up the link 193$^a$ and the arm 185, and drawing to the left at Fig. 3 the link 184, as well as the actuating head 180$^a$, and this brings the slot in the ear 180 into engagement with wrist 178, and at the same time the wrist 177 is disengaged from the slotted ear 179. The wrist 178 being nearer the fulcrum 195$^a$ of the lever 175 than the wrist 177, the lever is given a greater stroke, (the stroke of universal bar 173 being uniform) and hence the lower stripe 171 of the ribbon is thrown upward to cover the printing point at each key stroke, to cause the types to print red on the work sheet, thus indicating subtraction of the written number.

It has been shown how subtraction setting has been accomplished by the manipulation of the subtraction key 110, so that the subtraction computation can be carried on by the computing mechanism. This arrangement is all described in application No. 626,550, above mentioned. It now remains to be shown how the subtraction setting can be carried on automatically, without any thought on the part of the operator, by the previous adjustment of one or more subtraction tappets or stops on the carriage, so that the position of the carriage will control the character of computation of the computing mechanism in accordance with the particular column being written in.

It has been explained above that when any of the numeral or character keys have been actuated, the carriage is given a step by step movement under the control of its escapement mechanism. In computing and tabulating operation, in order to save time the carriage is generally jumped from one column to another. To accomplish this, there may be provided tabulating keys 196 mounted on key levers 197 pivoted intermediate their ends as at 198, and adapted to lift at their rear ends associated ones of a series of plungers 199, so that when one of the tabulating keys 196 is operated, the corresponding plunger 199 will be projected up into the path of one of a series of tappets or stops 200 adjustably mounted on a rack 201 carried by the typewriter carriage 11. Certain of these tappets or stops 200 may be termed subtraction tappets or stops, inasmuch as they are adapted to control the subtraction action of the computing mechanism. One of these subtraction tappets or stops is illustrated in Fig. 10.

It will be noted that the subtraction tappets project considerably to the rear as at 202, so that during the movement of the carriage they will come into engagement with the inclined edge 203 of a one-way acting follower or trip 204 mounted on a lever 205. The projection 202, however, of each subtraction tappet is cut away at 206, so that when the tappet is inverted as in Fig. 8, it will pass ineffectively over the follower 204 (Figs. 6 to 9) without actuating the same. The follower 204 has a lost motion connection with the lever 205, as by being connected thereto by a plurality of pin and slot connections 207 and 208, arranged in such a manner that when the carriage is returning as illustrated in Fig. 7, the tappet or stop 200 will come into engagement with the straight edge 209 of the follower 204 so that the follower is shifted downwardly against the tension of a spring 210 without moving the lever 205. This connection however, as will be seen by reference to Fig. 6, does not interfere with the normal operation of the lever by the subtraction tappets through the intermediary of the follower 204, in the normal letter-feeding or tabulating movement of the carriage.

The lever 205 which is pivotally mounted at 211, when depressed through the intermediary of the follower 204 by one of the subtraction tappets or stops 200, will swing downwardly from the position shown in Fig. 8 to the position shown in Fig. 6, so as to move downwardly a thrust link 212 which is pivotally connected at its bottom end to an arm 213 (Figs. 4 and 5) secured to a rock shaft 214. This rock shaft 214 also has secured thereon a bent arm 215 which forms with the rock shaft 214 and the arm 213 a bell crank lever. A spring 216 acts to hold the arm 215 in its normal depressed position (see Fig. 4). When the thrust link 212, however, is depressed, it raises the arm 215 against the tension of the spring 216 so that a pin 217 carried by this arm will engage the hook of a latch 218 and be held in its raised position. The latch 218 is pivotally mounted on a shaft 219 and normally held in a position tending to engage the pin 217 by a spring 220. The pin 217 when moved upwardly stretches a spring 221 so as to bring it under tension. This spring 221 is connected at its opposite end to a pin 222 mounted on a slide 223. The slide 223 is secured so as to rock with a plate lever 224, but also so as to have a vertical movement relative thereto, by means of a plurality of pin and slot connections 225 and 226. The slide 223 and the plate 224 may together be termed a trip. Although the tension of the spring 221 tends to raise the slide 223, this action is prevented, as will be seen by reference to Fig. 17, by the top end of the slide abutting against the cross-bar 50 of the general operator so that so long as the general operator is in its normal inactive position, the slide 223 of the trip will be prevented from moving upwardly. As soon, however, as the general operator is moved forwardly during the action of running up a computation, the cross-bar 50 will move from above the slide 223 permitting the spring 221 to act to raise the slide 223 to a position projecting in the path of the bar 50 on its return movement. The slide in its raised position is shown in Fig. 18.

When the general operator returns to its normal position, the bar 50 will engage the slide and rock the trip as a whole, which comprises the slide 223 and the lever 224, so that an arm 227 on the lever will engage an arm 228 on a lock 229 so as to raise the latter against the tension of a spring 230. It will be noted in passing that this rocking action also releases the latch 218 inasmuch as the latter has an arm 218[a] which extends in the path of movement of the trip. The lock 229 is supported for vertical movement by a pin and slot connection 231 and has an over-hang dog 232 which is normally located in the path of a pin 233 on a rack bar 234. This relation of the pin 233 to the lock 229 prevents the movement of the rack bar 234 to the rear. A spring 235 is normally under a tension tending to pull the rack bar 234 to the rear so that as soon as the lock 229 is raised this spring will act.

The rack of the rack bar 234 meshes with a pinion 236 so that as soon as the spring 235 acts, the gear 236 will be rotated. The gear 236 has a one way clutch connection with a cam shaft 237 which is shown in the form of a ball and socket clutch connection 238. This clutch connection is so arranged that when the spring acts, the gear 236 in rotating will also rotate the cam shaft 237. A return rotation of the shaft 237 during a subsequent return movement of the rack bar 234 is prevented, however, by a spring detent 239 which engages a ratchet 240 secured to the shaft 237. Also secured to the shaft 237 there is provided a double cam 241, which when the shaft 237 rotates, cams against a follower 242 as indicated in Fig. 19, whereby a link 243 which carries the follower 242 is moved rearwardly so as to rock the arm 115 to which it is pivotally secured as well as the subtraction key bar 114. After the cam 241 and the shaft 237 have rotated to the Fig. 19 position, which is but half way of their motion, they will continue so that the long end of the cam 241 will escape from the follower 242 allowing the subtraction rod 114 to return to its normal passive position. This withdraws the bails 134 and 134[a] to a position clear of the rack bars and the pins. The rack bar 234 remains in its actuated position until a subsequent actuation of the general operator. The link 243 may be guided by having its opposite end bifurcated and having the forks thereof extending on opposite sides of the shaft 237. It will thus be seen that the computing mechanism may be set for subtraction by a tappet or stop carried by the carriage as well as by the subtraction key 110.

The spring 235 is retensioned when the subtraction computation is run up by the cross-bar 50 engaging a hook 244 on the rack bar 234. In order that the latch 132 may be released to enable the computing mechanism to return to its adding state after the number to be subtracted has been run up by the action of the general operator, there is provided in one of the side bars of the general operator a notch 245 having a cam side 246, which at the forward movement of the general operator is adapted to engage a spherical enlargement 247 on an arm 248. This arm is secured to a rock shaft 249 which also has secured thereto an arm 250. When the arm 248 is swung to rock the shaft 249, the arm 250 comes into engagement with an arm 251 on the latch 132 and rocks the latch against the tension of its spring so as to permit the universal shifter bar 118 to return under the tension of its spring to its normal adding position, whereby the pin setting mechanism is shifted so that it will act to set the pins for adding. The rock shaft is returned for action by a spring 252 which is secured to a pin 253 on the rock shaft 249. In addition to releasing the universal shifter bar 118 by releasing the latch 132, the rock shaft 249 returns to normal the bichrome attachment. To do this the rock shaft 249 is provided with an arm 254 connected by a link 255 to an arm 256 on the rock shaft 192 so that the bichrome shifting mechanism will be returned simultaneously with the return to adding, whereby the subsequent printing will be black instead of red.

The link 255 has a pin and slot lost motion connection with the arm 256 so that the ribbon mechanism can be shifted without interfering with the computing mechanism.

Advantage is taken of the shifting of the bichrome attachment of the typewriter ribbon to indicate the character of computation being carried on by the computing mechanism. For this purpose the shaft 186 has secured thereto, an indicator with a plate bearing the letters A and S. This forms the indicator 260, which is arranged so that rotation of the shaft 186 will bring the letter A in opposition to an aperture 261 in a plate located at the front of the machine when the ribbon mechanism is arranged to print black corresponding to an adding action of the computing mechanism. The indicator 260 will likewise be swung so as to bring the letter S in opposition to the aperture 261 when the ribbon mechanism is arranged to print red corresponding to a subtraction action of the computing mechanism.

In the operation of the device considering more specifically the control of the state of the computing mechanism from the carriage, a subtraction tappet is set in the position indicated in Figs. 6, 7 and 10, with the projection thereof extending downwardly in such a position that it will engage the follower 204. It is to be noted that the subtraction tappet must be set to correspond with the stopping of the carriage for the column preceding the column in which it is desired to subtract. For example, we will assume that in the column preceding the one in which it is desired to subtract, an adding action is to be carried on. To bring the carriage to a position so that the numerals can be printed on a worksheet in the preceding adding column, one of the tabulating keys 196 is struck so that the associated plunger 199 will come up into the path of this subtraction tappet or stop 202.

The movement of the tappet or stop 202 over the follower 204 will depress one end of the lever 205 so that the thrust link 212 will rock the shaft 214 thereby raising the pin 217 (see Figs. 4 and 16 to 18) until the pin is caught by the latch 218. This action will stretch the spring 221 placing it under a tension inasmuch as the slide 223 engages the under side of the cross-bar 50 on the general operator so that it is prevented from further upward movement. When the typewriting keys have been actuated to set up the accumulating pins on the column bars, the general operator can be actuated to run up the accumulated computation on the computing wheels. As the general operator moves forward in carrying out this operation, the cross-bar 50 thereon will move from its position above the slide 223 so that the spring 221 is free to thrust the slide 223 upwardly into position shown in Fig. 18. As the general operator returns, the cross-bar 50 will come into engagement with the slide 223 of the trip, rocking the trip so that the latch 218 will be engaged thereby to release the pin 217, and thus permit the rock shaft 214 to turn back to its normal position carrying the associated parts back to their normal positions. The rocking of the trip also causes the offset arm 227 to engage the arm 228 and lift the lock 229 so that the dog 232 thereof will no longer prevent the movement of the rack bar 234. The spring 235 then acts to pull the rack bar rearwardly causing the rotation of the pinion 236 which transmits its rotation to the cam shaft 237. The cam shaft rotates through one-half of a revolution causing one end of the cam to shift the link 243 rearwardly by engaging with the follower 242 so that the arm 115 will be swung to rock the shaft 133. The bail 134 carried by the rock shaft 133 will be swung upwardly to raise all of the column bars 33, as well as the bar 158, whereby all of the "9" pins and the pin 159 may be set. The same action will draw rearwardly on the subtraction key rod 114 so that the wrist 116 thereon will come into engagement with the lever 117 to rock the shaft 134$^b$ to swing the universal bail 134$^a$ down to set the "9" pins and the pin 159. The lever 117 thrusts the universal shifter bar 118 forwardly so as to change the pin setting mechanism from the adding connection to the subtracting connection, whereby, instead of the pin corresponding to the number struck being set up, the pin corresponding to one less than the complement of the number struck will be set up, using the exchange value between denominations (i. e., ten in this instance) as the base in obtaining the complement. At the same time the link 190 will be drawn on to rock the shaft 192 and thus raise the link 193$^a$ to adjust the bichrome attachment so that instead of printing black it will print red. The actuation of the bichrome shift will rotate the shaft 186 so that the indicator 260 will be swung to bring the indicating letter S in opposition to the aperture 261 showing that the operation which will be carried on in the next column is a subtracting one. After the adding computation has been run up in this manner and the computing mechanism set for subtracting, one of the tabulating keys 196 is struck to bring the carriage to a position corresponding to the subtracting column. Numeral keys are then actuated to transcribe the numbers to the worksheet and at the same time the pin-setting mechanism will set up pins corresponding to one less than the complement of the numbers struck. The "9" pins on such of the pin-bars as have pins set by the striking of the numeral keys will be unset by means of the universal link 138 through the combined action of the numeral keys and the raising of the pin-bars. When the complete number has been thus set up, the general operator is caused to move forwardly by an actuation of the handle 57 and the number accumulated in the usual manner on the computing wheels as described in application No. 626,550.

As the general operator moves forward, the cross-bar 50 thereon comes in engagement with the hook 244 and retensions the spring 235. As soon as the pin 233 has slipped under the cam surface of the lock 229, this lock is automatically drawn down by the spring 230 until the dog 232 comes in back of the pin 233 and prevents the movement of the rack-bar 234 under the traction of the spring 235. The return of the lock 229 to its normal position will also return the trip to its normal position. When the general operator returns, it moves away from the hook 244 leaving it out in its extended position. At the initial forward movement of the general operator, the cam surface 246 of the notch 245 therein thrusts the arm 248 upwardly so as to rock the shaft 249. When the shaft 249 rocks, it carries upwardly the arm 250 until it swings the latch 132 out of engagement with the universal shifter bar 118 permitting this bar to return to its normal position carrying with it the series of rock shafts with the connected arms so that the arms 47 thereon once more engage the wrist 46 corresponding to an adding setting of the pins, or in other words, returning the pin setting mechanism to the state shown in Fig. 14. At the same time the rocking of the shaft 249 causes a swinging of the arm 254 so that the link 255 pulls down on the arm 256 to rock the shaft 192. The rocking of this shaft in turn pulls down on the link 193ª so that the ribbon shifting mechanism is once more adjusted to bring the black portion of the ribbon into play in place of the red portion. This action rotates the shaft 186 so as to swing the indicator 260, bringing the letter A in opposition to the aperture 261 indicating that the adding action has come in play. It will thus be seen that the change to subtraction can be controlled from the carriage as well as from the subtraction key, and that when the subtraction action has been completed the mechanism will automatically return to its adding state.

Variations may be resorted to within the scope of the invention, and portions of the improvements may be used without others.

Having thus described my invention, I claim:

1. The combination with typewriting mechanism, including a carriage and numeral keys, of computing mechanism, preliminary representation devices settable at the actuation of said numeral keys to temporarily set up a number, means to enable said keys to set said preliminary representation devices either to determine addition or to determine subtraction by said computing mechanism, and carriage-controlled means for determining whether said keys shall control said preliminary representation devices to determine addition or subtraction.

2. The combination with typewriting mechanism, including a carriage and numeral keys, of computing mechanism, pins for controlling the extent of movement of said computing mechanism, means controlled from said keys for setting said pins, and means to enable said carriage to determine whether addition or subtraction shall be performed by the said computing mechanism, said carriage-determining-means acting to control the manner in which said keys shall set said pins.

3. The combination with a typewriting mechanism, including a carriage, of a computing mechanism, means for controlling the character of computation carried on by said computing mechanism, a tappet carried by said carriage, and connections operated by said tappet on the movement of said carriage for manipulating said means to control the character of computation; said tappet being adjustably mounted on said carriage so as to be capable of being rendered effective or ineffective.

4. The combination with a typewriting mechanism including a carriage, of a computing mechanism, means for controlling the character of computation carried on by said computing mechanism, means normally tending to actuate said first-mentioned means to change the character of computation, a lock for restraining said second-mentioned means, a trip for said lock normally inoperative, and carriage controlled means for rendering said trip operative, said computing mechanism having means to actuate said trip when operative, so as to cause the release of said lock.

5. The combination with a typewriting mechanism including a carriage, of a computing mechanism, means for controlling the character of computation carried on by said computing mechanism, a tappet carried by said carriage, and connections operated by said tappet on the movement of said carriage for manipulating said means to control the character of computation; said connections including a two-part means, one of said parts being yielding when approached from one direction to enable an ineffective return movement of said tappet with said carriage.

6. The combination with setting-up mechanism, of computing mechanism, a general operator for running into the computing mechanism numbers set up by said setting-up mechanism, and means to enable said general operator to change the normal character of the computation, said general operator also acting to restore said changing means to normal.

7. The combination with setting-up mechanism, of accumulating mechanism, a general operator for running into said accumulating mechanism numbers as determined by said setting-up mechanism, a subtraction-setting mechanism for varying the action of said setting-up mechanism to enable a subtracting action thereof, means enabling said general operator to set said subtraction-setting mechanism for a subtracting action, said general operator also automatically rendering said subtraction-setting mechanism ineffective after a complete subtracting action.

8. The combination with computing mechanism, of printing mechanism to print the numbers computed in different zones or columns, setting means acting to anticipate a change in the character of the computation by said mechanism for a computing zone subsequent to that in which said setting means acts, and means for subsequently actuating said setting means to change the character of the computation.

9. The combination with computing mechanism, of printing mechanism to print the numbers computed in different zones or columns, setting means to anticipate a change in the character of the computation by said computing mechanism for a computing zone subsequent to that in which said setting means acts, means for holding said setting means in set position, and tripping means for releasing said setting means.

10. The combination with a computation mechanism including a general operator, of a subtraction setting mechanism to enable said computing mechanism to subtract, means normally tending to operate said subtraction setting mechanism, a lock for preventing the action of said means, a trip for releasing said lock including a lever and a slide having a movement relative to said lever, and means for projecting said slide into the path of movement of said general operator, so as to enable said general operator to swing said trip to release said lock.

11. The combination with a computation mechanism including a general operator, of a subtraction setting mechanism to enable said computing mechanism to subtract, means normally tending to operate said subtraction setting mechanism, a lock for preventing the action of said means, a trip for releasing said lock including a lever and a slide having a movement relative to said lever, and means tending when set to move said slide to a position such that said general operator can actuate said trip, a part of said general operator acting as an obstruction preventing the movement of said slide when said general operator is in its normal position.

12. The combination with a computation mechanism including a general operator, of a subtraction setting mechanism to enable said computing mechanism to subtract, means normally tending to operate said subtraction setting mechanism, a lock for preventing the action of said means, a trip for releasing said lock including a lever and a slide having a movement relative to said lever, a spring for moving said slide to a position such that said trip may be rocked by said general operator, and means for tensioning said spring.

13. The combination with a computation mechanism including a general operator, of a subtraction setting mechanism to enable said computing mechanism to subtract, means normally tending to operate said subtraction setting mechanism, a lock for preventing the action of said means, a trip for releasing said lock including a lever and a slide having a movement relative to said lever, a spring for moving said slide to a position such that said trip may be rocked by said general operator, and means for tensioning said spring, a part of said general operator being located in the path of movement of said slide when said general operator is in its normal position, to prevent the movement of said slide.

14. The combination with a computation mechanism including a general operator, of a subtraction setting mechanism to enable said computing mechanism to subtract, means normally tending to operate said subtraction setting mechanism, a lock for preventing the action of said means, a trip for releasing said lock including a lever and a slide having a movement relative to said lever, a spring for moving said slide to a position such that said trip may be rocked by said general operator, means for tensioning said spring, a part of said general operator being located in the path of movement of said slide when said general operator is in its normal position, to prevent the movement of said slide, and a latch for maintaining the tension on said spring.

15. The combination with a computation mechanism including a general operator, of a subtraction settting mechanism to enable said computing mechanism to subtract, means normally tending to operate said subtraction setting mechanism, a lock for preventing the action of said means, a trip for releasing said lock including a lever and a slide having a movement relative to said lever, a spring for moving said slide to a position such that said trip may be rocked by said general operator, means for tensioning said spring, a part of said general operator being located in the path of movement of said slide when said general operator is in its normal position, to prevent the movement of said slide, a latch for maintaining the tension on said spring, and means to enable the movement of said trip to release said latch.

16. The combination with a computing mechanism including a general operator, of a subtraction setting mechanism to enable said computing mechanism to subtract, means normally tending to operate said subtraction setting mechanism including a spring under tension, a lock for preventing the action of said means releasable to enable said spring to act, and connections enabling said general operator to re-tension said spring.

17. The combination with a computing mechanism, of means for controlling the character of computation carried on by said mechanism, a cam for operating said means, a shaft for rotating said cam, a gear connected to said shaft, and a rack meshing with said gear to rotate the same.

18. The combination with a computing mechanism, of means for controlling the character of computation carried on by said mechanism, a cam for operating said means, a shaft for rotating said cam, a gear connected to said shaft, a rack meshing with said gear to rotate the same, and means for actuating said rack.

19. The combination with a computing mechanism, of means for controlling the character of computation carried on by said mechanism, a cam for operating said means, a shaft for rotating said cam, a gear connected to said shaft, a rack meshing with said gear to rotate the same, means for actuating said rack, and a lock for holding said rack against movement.

20. The combination with a computing mechanism, of means for controlling the character of computation carried on by said mechanism, a cam for operating said means, a shaft for rotating said cam, a gear connected to said shaft, a rack meshing with said gear to rotate the same, means for actuating said rack, a lock for holding said rack against movement, and a trip for releasing said lock.

21. The combination with a computing mechanism, of means for controlling the character of computation carried on by said mechanism, a cam for operating said means, a shaft for rotating said cam, a gear connected to said shaft, a rack meshing with said gear to rotate the same, means for actuating said rack, a lock for holding said rack against movement, a trip for releasing said lock, said trip being normally ineffective, and means for rendering said trip effective.

22. The combination with a computing mechanism, of means for controlling the character of computation carried on by said mechanism, a cam for operating said means, a shaft for rotating said cam, a gear connected to said shaft, a one-way clutch connection between said gear and said shaft, a rack meshing with said gear, and means for operating said rack.

23. The combination with a computing mechanism, of means for controlling the character of computation carried on by said mechanism, means for actuating said first-mentioned means, a lock for preventing the action of said second-mentioned means, a normally inactive trip for releasing said lock having relatively movable parts, and a spring tensionable so as to tend to move said parts relatively to each other, and so as to tend to render said trip effective.

24. The combination with a computing mechanism, of means for controlling the character of computation carried on by said mechanism, means for actuating said first-mentioned means, a lock for preventing the action of said second-mentioned means, a normally inactive trip for releasing said lock having relatively movable parts, a spring tensionable so as to tend to move said parts relatively to each other, and so as to tend to render said trip effective, and a latch for maintaining the tension on said spring until a relative movement of said parts has taken place.

25. The combination with computation accumulating means, capable of accumulating either for addition or subtraction, of a universal shifter bar for determining the character of computation, a latch for holding said shifter bar in one position, a general operator for running up the accumulated computation, said general operator having a notch therein, an arm engaging said notch when said general operator is in its normal position, and means connected to said arm capable of engaging said latch, to release the same when said arm is moved by said general operator.

26. The combination with a typewriting mechanism including a bichrome attachment, of a computation accumulating means capable of accumulating either for addition or subtraction, subtraction setting mechanism for determining the character of computation, connections between said subtraction setting mechanism and said bichrome attachment enabling the concomitant change in the color of printing with the change in the character of computation, means adapted to set said subtraction setting mechanism to change the character of accumulation, a latch for holding said means in a certain position, a shaft, an arm on said shaft operating to release said latch, and connections from said shaft to said bichrome attachment enabling 27. The combination with a plurality of computing wheels, of bars for operating said computing wheels, a series of pins on each of said bars, pin-setting mechanism for said pins, a bail for actuating all of said bars concomitantly, an arm connected to said bail, a link having a follower thereon connected to said arm, and a cam engaging said follower to shift said link so as to actuate said bail.

28. The combination with a plurality of computing wheels, of bars for operating said computing wheels, a series of pins on each of said bars, pin-setting mechanism for said pins, a bail for actuating all of said bars concomitantly, an arm connected to said bail, a link having a follower thereon connected to said arm, a cam engaging said follower to shift said link so as to actuate said bail, and means settable to operate said cam at a predetermined instant.

29. The combination with a typewriting mechanism including a carriage, stops mounted on said carriage, and a jump movement mechanism for said carriage controlled by the engagement of said stops with a certain part of said jump movement mechanism, of a computing mechanism capable of either adding or subtracting, a subtraction setting mechanism for determining the character of computation of said computing mechanism, and means operable by certain of said stops for adjusting said subtraction setting mechanism to determine the character of computation of said computaing mechanism.

30. The combination with a computing mechanism including a carriage, stops mounted on said carriage, tabulating keys, and plungers movable by said tabulating keys into the path of said stops to determine the extent of movement of said carriage, of a computing mechanism capable of adding or subtracting, a subtraction setting mechanism for determining the character of computation of said computing mechanism, and connections operable by certain of said stops to adjust said subtraction setting mechanism to determine the character of computation of said computing mechanism.

31. The combination with a typewriting mechanism including a carriage, stops on said carriage, a jump movement mechanism for said carriage acting by having certain parts thereof moving into the path of said stops, of a computing mechanism, having means to control the character of computation carried on thereby, and connections operable by certain of said stops to manipulate said means whereby the character of computation carried on by said computing mechanism may be controlled from said carriage through the intermediary of said stops.

32. The combination with a carriage, of tappets carried by said carriage, a follower engageable by said tappets, a lever secured to said follower, a link operated by said lever, a bell crank lever operated by said link, a spring tensioned by said bell crank lever, a slide connected to said spring, a lever forming with said slide a trip, a lock releasable by said trip, a rack held against movement by said lock, a spring for manipulating said rack, a gear rotatable by said rack, a shaft rotatable by said gear, a cam on said shaft, a computing mechanism having means to control the character of computation carried on thereby, and connections between said cam and said means whereby a rotation of said cam will change the character of computation carried on by said computing mechanism.

33. The combination with a plurality of computing devices arranged to compute numbers and having exchange values from one wheel to the next wheel, of a series of numeral keys having different values for controlling the advancement of said computing devices distances related to the values of the keys, means controlled by said numeral keys for advancing each computing device a complete cycle to correspond with its exchange value to the next higher computing device, less the value of the keys actuated in columns corresponding to the several computing devices, and automatic means for bringing into play said last-mentioned means at predetermined intervals.

34. The combination with a computation-accumulating mechanism, of a series of linkages for setting up a computation in said mechanism, a series of numeral keys, a rock shaft for each of said numeral keys, a plurality of arms on a plurality of individuals of said rock shafts, means for shifting said rock shafts to vary the connection of said arms with said linkages so that individuals of said numeral keys may actuate different ones of said linkages, a traveling carriage, and means for controlling the actuation of said last-mentioned means from said traveling carriage.

35. The combination with a plurality of denominational elements, each having a plurality of digit-representing members settable to determine the extent of movement of said elements, said digit-representing members running from lowest to highest value to correspond with the exchange value between each denominational element and the next higher element, of means universal to all of the digit members of highest value arranged to set said members concomitantly, means for shifting all of said denominational elements concomitantly to enable the setting of all of said digit members of highest value concomitantly, a traveling carriage, and means for controlling the actuation of both of said last two mentioned means from said carriage.

36. The combination with a series of denominational elements, each having a series of digit-representing members thereon ranging from lowest to highest values according to the exchange value between each denominational element and the next higher denominational element, said members being settable to determine the extent of movement of the associated elements, of a frame universal to all of the digit members of highest value, a frame universal to all of the denominational elements, a traveling carriage, and carriage-controlled means for controlling the actuation of both of said universal frames.

37. The combination with a series of denominational elements, each having a series of digit-representing members thereon ranging from lowest to highest value according to the exchange value between each denominational element and the next higher denominational element, said members being settable to determine the extent of movement of the associated elements, of a frame universal to all of the digit members of highest value, a frame universal to all of the denominational elements, and automatic means for controlling the actuation of both of said universal frames at predetermined points in a series of computations.

38. The combination with a series of denominational elements, of means coöperating with said elements to accumulate a computation, means for shifting said elements individually to enable the setting up of digits of a computation, means for shifting all of said elements concomitantly to effect the setting up of the highest digit for each and all of the denominational elements concomitantly, a traveling carriage, and carriage-controlled means for governing the action of said last-mentioned means.

39. The combination with a series of bars, of a series of pins on each of said bars ranging from lowest value to highest ultimate value, a frame universal to all of said pins of highest ultimate value, a frame universal to all of said bars, and automatic means for controlling the actuation of both of said universal frames at predetermined points in a series of computations.

40. The combination with a series of bars, of a series of pins on each of said bars settable to determine the extent of movement of said bars, said pins ranging from those corresponding to smallest movements of said bars to those corresponding to greatest movements of said bars, means for setting the pins on each of said bars corresponding to the greatest movements of their associated bars, means for shifting all of said bars to have said last-mentioned pins set, and automatic means brought into play at predetermined intervals to control the actuation of both of said last two mentioned means.

41. The combination with computing mechanism arranged to compute a series of numbers in different computing zones, of a carriage traveling to determine different computing zones, a state-controlling mechanism for said computing mechanism, to determine the character of computation carried on thereby, and automatic means operated from said carriage in the zone preceding the zone to be controlled, for tripping said state-controlling mechanism to a condition to act in the proper zone.

42. The combination with computing mechanism arranged to compute a series of numbers in different computing zones, of a carriage traveling to determine different computing zones, state-controlling mechanism for said computing mechanism, to determine the character of computation carried on thereby, automatic means operated from said carriage in the zone preceding the zone to be controlled, for tripping said state-controlling mechanism to a condition to act in the proper zone, and means for holding said state-controlling mechanism tripped until required in the proper computing zone.

43. The combination with a traveling carriage, of tabulating mechanism therefor, computing mechanism, state controlling mechanism for said computing mechanism, a spring to set said state controlling mechanism to operative position, a latch normally restraining said spring and means controlled from a part of said tabulating mechanism for releasing said latch at a predetermined point in the travel of said carriage.

44. The combination with a computing head having computing wheels, of a drive for said computing head, acting to rotate said wheels in concert, indexing devices for determining the extent of action of said drive, a carriage traveling to determine different computing zones, tabulating mechanism for determining the position of said carriage, including stops carried by said carriage, state-controlling mechanism for changing the type of action of said indexing devices, to enable different characters of computation, and connections enabling certain of said stops to control an action of said state-controlling mechanism.

45. The combination with computing mechanism, of subtraction-controlling mechanism for said computing mechanism enabling the same to effect a subtracting operation, means normally tending to operate said subtraction-controlling mechanism, a lock for preventing the action of said means, a trip for releasing said lock, including a lever, a slide having a movement relative to said lever, and means normally projecting in the path of said slide to prevent the actuation thereof.

46. The combination with a computing mechanism, of subtraction-setting mechanism for said computing mechanism including a subtraction bar, and automatic means for actuating said subtraction bar and thus said computing mechanism for subtraction, and releasing said subtraction bar while it itself remains in its actuated condition.

47. In a combined typewriting and computing machine, the combination with a traveling carriage, of computing mechanism, setting-up mechanism, a general operator for running into said computing mechanism numbers as determined by said setting-up mechanism, and means enabling said carriage and general operator to jointly act to change the normal character of computation as determined by said setting-up mechanism.

48. The combination with typewriting mechanism, including a carriage and numeral keys, of computing mechanism, preliminary representation devices settable at the actuation of said numeral keys to temporarily set up a number, means to enable said keys to set said preliminary representation devices either to determine addition or to determine subtraction by said computing mechanism, a general operator for running into the computing mechanism the numbers determined by said preliminary representation devices, and means to enable said carriage and general operator to jointly determine whether said keys shall control said preliminary representation devices to determine addition or subtraction.

49. In a combined typewriting and computing machine, the combination with a traveling carriage, of computing mechanism, a general operator for said computing mechanism, and means controlled jointly by said carriage and said general operator for determining the state of said computing mechanism.

50. In a combined typewriting and computing machine, the combination with a traveling carriage, of computing mechanism, a general operator, means for determining the character of the computation carried on by said computing mechanism, and means acting through the joint control of said carriage and general operator for controlling said determining means.

51. In a combined typewriting and computing machine, the combination with a traveling carriage, of computing mechanism, a general operator for said computing mechanism, means for determining the character of the computation to be carried on by said computing mechanism, means brought into action by said carriage for preliminarily setting said computation-determining-means, and means brought into operation by the general operator for completing the setting of said computation-determining-means.

52. In a combined typewriting and computing machine, the combination with a traveling carriage, of computing mechanism, a general operator for said computing mechanism, computation-determining-means for determining the character of the computation, means actuated by said carriage for preliminarily setting said computation-determining-means to change the character of the computation, means brought into action by said general operator on completion of a calculation as determined by said carriage, to complete the setting of said computation-determining-means, means for latching said computation-determining-means in position as set by said general operator to determine the character of the computation on a subsequent operation of said computing mechanism by said general operator, and means for rendering said latching means ineffective brought into action by said general operator when subsequently actuating said computing mechanism.

53. The combination with a computing mechanism, of indexing devices therefor, of means for running up all of the indexed digits concomitantly, a traveling carriage, tabulating mechanism for controlling the movements of said carriage for different computing zones or columns, and connections between a part of said tabulating mechanism and said computing mechanism for acting on said indexing devices for controlling the change in state of said computing mechanism, so as to bring about a different type of computation by said computing mechanism.

54. The combination with a nest of pins settable to determine the extent of a computation, of setting mechanism for said pins, means for adjusting said setting mechanism so as to change the state thereof to correspond with the setting of said pins for different types of computation, a traveling carriage, tabulating mechanism for controlling the movements of said carriage for different computing zones or columns, and connections between a part of said tabulating mechanism and said adjusting means for varying the type of setting action of said pin-setting mechanism to correspond with a different type of computation.

55. The combination with a computing mechanism, capable of existing under a plurality of states corresponding to different types of computation, of a traveling element for determining the different computing zones or columns, tabulating mechanism for said traveling element to bring the same to different computing zones or columns, and connections between said computing mechanism and a part of said tabulating mechanism to enable the concomitant movement from one zone or column to another with a change in state of said computing mechanism.

RICHARD M. BECKER.

Witnesses:
J. F. BROPHY,
F. E. ALEXANDER.